(12) United States Patent
Salonen

(10) Patent No.: US 7,524,458 B2
(45) Date of Patent: Apr. 28, 2009

(54) SCREEN PLATE OF AN IMAGING MEASURING INSTRUMENT

(75) Inventor: Janne Salonen, Mynämäki (FI)

(73) Assignee: Wallac Oy, Turku (FI)

( * ) Notice: Subject to any disclaimer, the term of this patent is extended or adjusted under 35 U.S.C. 154(b) by 173 days.

(21) Appl. No.: 10/133,627

(22) Filed: Apr. 29, 2002

(65) Prior Publication Data

US 2002/0164268 A1    Nov. 7, 2002

(30) Foreign Application Priority Data

Apr. 27, 2001    (FI)  ................................ 20010881

(51) Int. Cl.
*G01N 21/00*    (2006.01)
(52) U.S. Cl. ...................... 422/82.05; 436/164; 356/417
(58) Field of Classification Search .................. 422/58, 422/61, 82.05; 436/164; 356/417
See application file for complete search history.

(56) References Cited

U.S. PATENT DOCUMENTS 6,097,025 A * 8/2000 Modlin et al. .......... 250/227.22
6,483,582 B2 * 11/2002 Modlin et al. ............... 356/317
2004/0070726 A1 * 4/2004 Ishak ......................... 351/163

FOREIGN PATENT DOCUMENTS

EP    0987540 A2 *    3/2000
JP    2001005101    *    1/2001

* cited by examiner

*Primary Examiner*—Lyle A. Alexander
(74) *Attorney, Agent, or Firm*—Kubovcik & Kubovcik

(57) ABSTRACT

Screen plate (10) of an imaging measuring instrument, intended for use in absorption measurement of samples relating to the fields of biochemistry and medicine. The screen plate comprises a plate (11) made of light-absorbing material, such as darkened or colored glass, preferably gray glass. One surface of the screen plate is provided with a scattering and/or fluorescent surface layer (12) and the opposite side is provided with an anti-reflection film (13). Instead of a scattering and/or fluorescent surface layer, the absorbing plate may also have both scattering and/or fluorescent properties.

11 Claims, 1 Drawing Sheet

SCREEN PLATE OF AN IMAGING MEASURING INSTRUMENT

SUBJECT OF THE INVENTION

The present invention relates to a screen plate for an imaging measuring instrument, mainly intended for use in absorption measurement of samples relating to the fields of biochemistry and medicine, which screen plate comprises
- at least one fluorescent or light-scattering layer,
- at least one base layer, such as glass plate or plastic plate, on which the fluorescent or light-scattering layer is located.

In an absorption measurement method, when a sample is illuminated with visible light or UV light, some of the light is absorbed into the sample and some of it passes through the sample. The light having passed through the sample is received on a screen placed on the opposite side of the sample relative to the light source, and thus an image of the light field having penetrated the sample is formed on the screen. When visible light is used, the screen plate is usually made of scattering material or it is a glass plate with a coat of scattering material on its surface. The image thus produced on the screen is examined by means of an imaging measuring instrument, which is presented e.g. in the EP-patent application publication 987540 A2.

When UV light is used to illuminate the sample, absorption of UV light occurs in the sample so that the UV light passing through the sample is inversely proportional to the absorption occurring in different parts of the sample. Before the absorption of UV light can be examined using an imaging measuring instrument, the UV light has to be converted into visible light. The UV light having penetrated the sample can be rendered visible by using a screen plate consisting of a wavelength converter plate that converts the incident UV light into visible light. In the converter plate, the conversion of UV light into visible light takes place via fluorescence. The converter plate is a fluorescent plate or it has a fluorescent surface, from which the visible light can be scattered further. The intensity of the fluorescence light thus produced is directly proportional to the intensity of the UV light having penetrated the sample. The wavelength of the UV light incident on the converter plate is generally 250-400 nm, which is converted via fluorescence in the converter plate into visible light having a wavelength of e.g. about 400-800 nm.

PRIOR ART

Prior-art visible-light scattering plates or converter plates used for UV light are usually manufactured in such manner that the body of the plate consists of a glass plate with a scattering or fluorescent coating attached to its surface. In an imaging measuring instrument, the coating is placed on that side of the plate, which faces towards the sample. When the light having passed through the sample hits the scattering surface of the scattering plate, an image of the light ray is formed at this point. Correspondingly, when UV light is having passed through the sample hits a fluorescent surface, it is converted into visible light and an image of the light ray is formed at this point. After that, the image thus formed on the surface of the scattering plate or converter plate is recorded by means of an imaging measuring instrument.

However, prior-art scattering plates and converter plates involve the problem of blurring of the image pixel perceived by the imaging measuring instrument. This is a result of the fact that the scattered light or fluorescence light does not only propagate towards the imaging measuring instrument but is also reflected or scattered laterally from this point in all solid angle directions within the glass plate. Thus, at least some of the light rays advancing in oblique lateral directions are reflected from the opposite surface of the glass plate back to the scattering or fluorescent coating, from which it is further reflected back or scattered in all solid angle directions. Such reflection or scattering goes on occurring repeatedly, forming numerous ghost images around the original light pixel that blur the image of the original light pixel.

OBJECT OF THE INVENTION

The objects of the invention is to achieve a new screen plate that does not involve the disadvantages described above.

FEATURES CHARACTERISTIC OF THE INVENTION

The screen plate of the invention is characterized in
- that base layer of the screen plate is made of light-absorbing material having so small light transmission coefficient that only those light rays coming from the fluorescent or light-scattering layer, mainly in a direction perpendicular to the base layer, will pass through the said base layer,
- that the base layer is preferably made of darkened glass or plastic, such as gray glass or gray plastic, having a light transmission coefficient below 10%.

According to the invention, the degree of attenuation produced by the darkened glass plate or other equivalent plate is designed to be such that, of a light ray incident on the scattering or fluorescent surface, only light rays advancing by the shortest route to the imaging measuring instrument, i.e. in a direction perpendicular to the surface of the glass plate, can pass through with a sufficient degree of intensity, whereas light rays reflected or scattered laterally within the glass plate are effectively attenuated, because, as they are reflected back from the opposite surface of the glass plate, they have to travel through a multiple distance within the glass plate. The attenuation is the more effective the more the reflected or scattered light ray diverges from the direction perpendicular to the surface of the glass plate. Therefore, when a screen plate according to the invention is used, no ghost images reducing the sharpness of the light pixel are generated.

EMBODIMENTS OF THE INVENTION

A preferred embodiment of the scattering plate of the invention is characterized in that the screen plate comprises
- a base plate made of light-absorbing material, such as gray glass or gray plastic, having a light transmission coefficient below 10%.
- and a surface layer, which is made of material having both fluorescent and light-scattering properties, suitable for absorption measurements using light having a wavelength of 250-800 nm.

A second preferred embodiment of the scattering plate of the invention is characterized in that the base plate of the screen plate is made of gray glass or gray plastic having a light transmission coefficient below 10%, and the surface layer is made of fluorescent material suitable for absorption measurements using UV-light having a wavelength of 250-400 nm.

A third preferred embodiment of the scattering plate of the invention is characterized in that the base plate of the screen plate is made of gray glass or gray plastic having a light transmission coefficient below 10%, and the surface layer is made of light-scattering material suitable for absorption measurements using visible light having a wavelength of 400-800 nm.

A fourth preferred embodiment of the scattering plate of the invention is characterized in
   that the base plate of the screen plate is made of gray glass or gray plastic having a light transmission coefficient below 10%,
   that the base plate is provided with a two-layer surface layer, which comprises the first layer made of fluorescent material suitable for absorption measurements using UV-light having a wavelength of 250-400 nm, and the second layer made of light-scattering material suitable for absorption measurements using visible light having a wavelength of 400-800 nm.

A fifth preferred embodiment of the scattering plate of the invention is characterized in
   that the base plate of the screen plate made of gray glass or gray plastic having a light transmission coefficient below 10%,
   that one side of the base plate is provided with a surface layer, which is made of fluorescent and/or light-scattering material,
   and that the opposite side of the base plate is provided with a film preventing the reflection of light.

A sixth preferred embodiment of the scattering plate of the invention is characterized in that the base plate of the screen plate is made of darkened glass or plastic, such as gray glass or gray plastic, having a light transmission coefficient preferably below 1%,

EXAMPLES OF EMBODIMENTS

In the following, the invention will be described in detail with reference to the attached drawings, wherein List of Drawings FIG. 1 presents a cross-section of a screen plate used in absorption measurement.

FIG. 2 corresponds to FIG. 1 and presents a second embodiment of the screen plate.

FIG. 3 corresponds to FIG. 1 and presents a third embodiment of the screen plate.

DESCRIPTION OF DRAWINGS

In the situation presented as an example in FIG. 1, a light ray R having passed through the sample has fallen on point $S_1$ in the surface layer 12 provided on the surface of the screen plate 10. If the light having fallen on point $S_1$ is visible light, then from this point $S_1$ of the scattering surface layer 12 visible light will scatter in different directions within the plate 11. Correspondingly, if the light having reached point $S_1$ is UV light, then in this case fluorescence light will scatter in different directions within the plate 11 from point $S_1$ of the fluorescent surface layer 12. In FIG. 1, arrows pointing in different directions diagrammatically indicate these light rays advancing within the plate 11.

If the plate 11 in the example in FIG. 1 were made of clear glass, as is the case with prior-art screen plates, then the light rays scattering in different directions from point $S_1$ would advance unobstructed in all directions inside the glass plate 11. FIG. 1 presents an example of a light ray advancing inside a clear glass plate 11 from point $S_1$ obliquely to point $P_1$ on the opposite surface 13 of the plate. Part $R_1$ of the light ray now advances further out of the glass plate 11 while part of it is reflected back towards the scattering surface 12. In FIG. 1, this latter light ray hits the scattering surface 12 at points $S_2$, from where the light ray is scattered again and part of it is reflected to point $P_2$. At this point, the same situation as at point $P_1$ is repeated, in other words, part $R_2$ of the light ray advances out of the glass plate 11 while part of it is reflected back towards the scattering surface 12, falling on it at point $S_3$. Thus, each extra reflection of the light ray R adds to the number of light rays $R_1$, $R_2$ and so on coming out of the glass plate 11.

FIG. 1 shows plainly that if a clear glass plate 11 is used and the reflections inside the glass plate can advance unobstructed in oblique lateral directions, then there will also be, in addition to the main light ray R, a large number of extra light rays $R_1$, $R_2$ and so on coming out of the glass plate 11, and these are perceived as numerous ghost images. It is obvious that the ghost images render the image of the light ray R seen on the imaging measuring instrument substantially more blurred.

Figure 1:
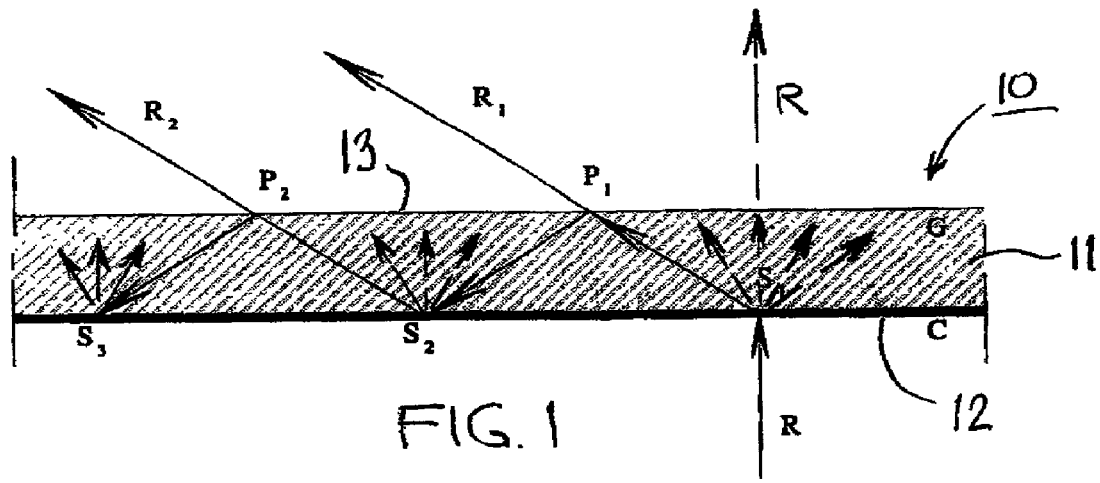
FIG. 1 presents a cross-sectional view of a screen plate 10 according to the invention for use in absorption measurement. The body of the screen plate consists of a plate 11 made of absorbing material, such as darkened or colored glass or plastic, and having a surface layer 12 on its surface. According to the invention, the plate 11 is preferably made of gray glass, which effectively absorbs light advancing through it. The surface layer 12 is made of scattering material for visible light or of fluorescent material for UV light. A fluorescent surface layer may simultaneously have a scattering property. By choosing the properties of the surface layer, the same screen plate of the invention can also be used for both visible light and UV light absorption measurements.

By contrast, if the plate 11 in FIG. 1 is, as provided by the invention, a plate made of a material having effective light-absorbing properties, such as gray or colored glass or plastic, then only the light ray R advancing perpendicularly by the shortest route through the plate 11 will emerge from the plate. All other light rays, i.e. all reflections in lateral directions as well as light rays scattered in different directions are effectively attenuated inside the plate 11 of gray glass. To eliminate any weak reflections that may remain, the surface opposite to the scattering surface 12 of plate 11 is additionally provided with an anti-reflection film 13. It is obvious that in this case no ghost images will appear and that the light ray R will be seen as a clear and sharp image on the imaging measuring instrument.

Figure 2:
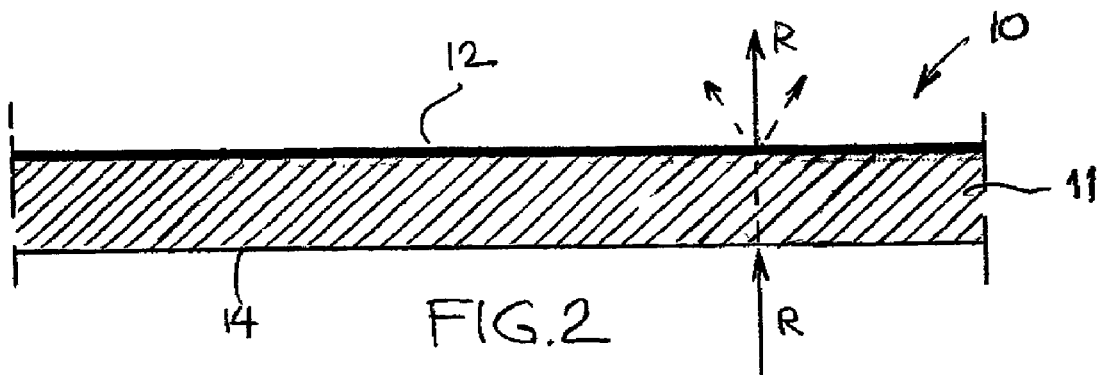

FIG. 2 presents a screen plate 10 having a scattered surface layer 12 placed on the opposite side of it as compared with FIG. 1, while the other surface of the gray glass plate 11 is provided with an anti-reflection film 14. In this embodiment, too, no undesirable ghost images emerge from inside the gray glass plate 11, but a scattering surface layer 12 thus placed may slightly reduce the sharpness of the image seen on the imaging measuring instrument.

Figure 3:
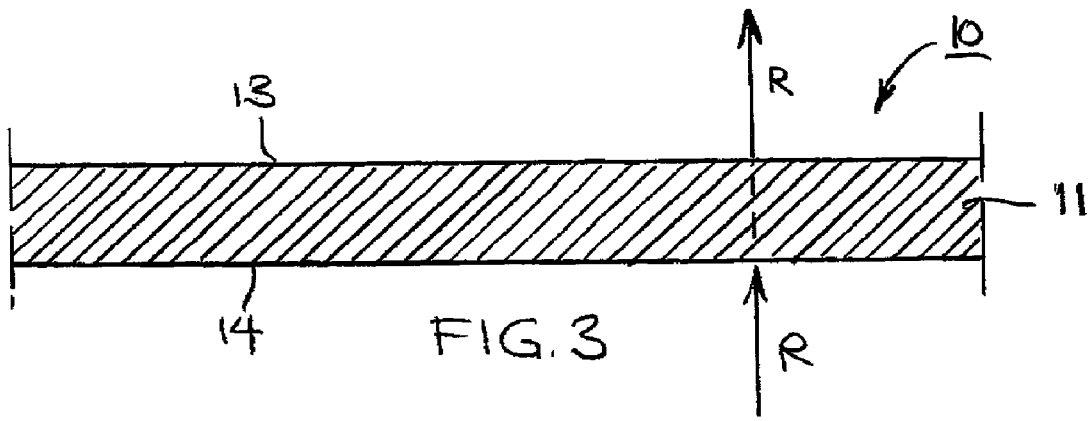

FIG. 3 presents an embodiment that has no scattering surface layer at all. Instead, the two opposite surfaces of the gray glass plate 11 are each provided with an anti-reflection film 13 and 14. This embodiment is not suited for UV light, but it is sufficient in certain visible-light absorption measurement applications.

The invention claimed is:

1. A screen plate of an imaging measuring instrument, mainly intended for use in absorption measurement of samples relating to the fields of biochemistry and medicine, which screen plate comprises
   at least one layer (a) selected from the group consisting of a fluorescent layer, a light-scattering layer and a combination fluorescent and light scattering layer, at least one base plate (b) on which said at least one layer (a) is located, said layer (a) being in contact with said base plate (b), characterized in that base plate (b) of the screen plate is made of light-absorbing material which allows only those light rays coming from said layer (a), mainly in a direction perpendicular to the base plate (b), to pass through the said base plate (b).

2. A screen plate as defined in claim 1, characterized in that the screen plate comprises the base plate (b) made of light-absorbing material having a light transmission coefficient below 10%, and the layer (a), which is made of a material having both fluorescent and light-scattering properties, suitable for absorption measurements using light having a wavelength of 250-800 nm.

3. A screen plate as defined in claim 1, characterized in that the base plate (b) of the screen plate is made of gray glass or gray plastic having a light transmission coefficient below 10%, and the layer (a) is made of fluorescent material suitable for absorption measurements using UV-light having a wavelength of 250-400 nm.

4. A screen plate as defined in claim 1, characterized in that the base plate (b) of the screen plate is made of gray glass or gray plastic having a light transmission coefficient below 10%, and the layer (a) is made of light-scattering material suitable for absorption measurements using visible light having a wavelength of 400-800 nm.

5. A screen plate as defined in claim 1, characterized in that the base plate (b) of the screen plate is made of gray glass or gray plastic having a light transmission coefficient below 10%, that the base plate (b) is provided with a two-layer layer (a), which comprises a first layer made of fluorescent material suitable for absorption measurements using UV-light having a wavelength of 250-400 nm, and a second layer made of light-scattering material suitable for absorption measurements using visible light having a wavelength of 400-800 nm.

6. A screen plate as defined in claim 1, characterized in that the base plate (b) of the screen plate is made of gray glass or gray plastic having a light transmission coefficient below 10%, that one side of the base plate (b) is provided with the layer (a), and that the opposite side of the base plate (b) is provided with a film preventing the reflection of light.

7. A screen plate as defined in claim 1, characterized in that the base plate (b) of the screen plate is made of gray glass or gray plastic having a light transmission coefficient below 1%.

8. A screen plate as defined in claim 2, characterized in that the base plate (b) of the screen plate is made of gray glass or gray plastic having a light transmission coefficient below 1%.

9. A screen plate as defined in claim 3, characterized in that the base plate (b) of the screen plate is made of gray glass or gray plastic having a light transmission coefficient below 1%.

10. A screen plate as defined in claim 4, characterized in that the base plate (b) of the screen plate is made of gray glass or gray plastic having a light transmission coefficient below 1%.

11. A screen plate as defined in claim 5, characterized in that the base plate (b) of the screen plate is made of gray glass or gray plastic having a light transmission coefficient below 1%.

* * * * *